N. P. COLLIS.
METHOD OF DRYING BUTTERMILK.
APPLICATION FILED OCT. 3, 1919.
1,356,340.
Patented Oct. 19, 1920.
3 SHEETS—SHEET 2.
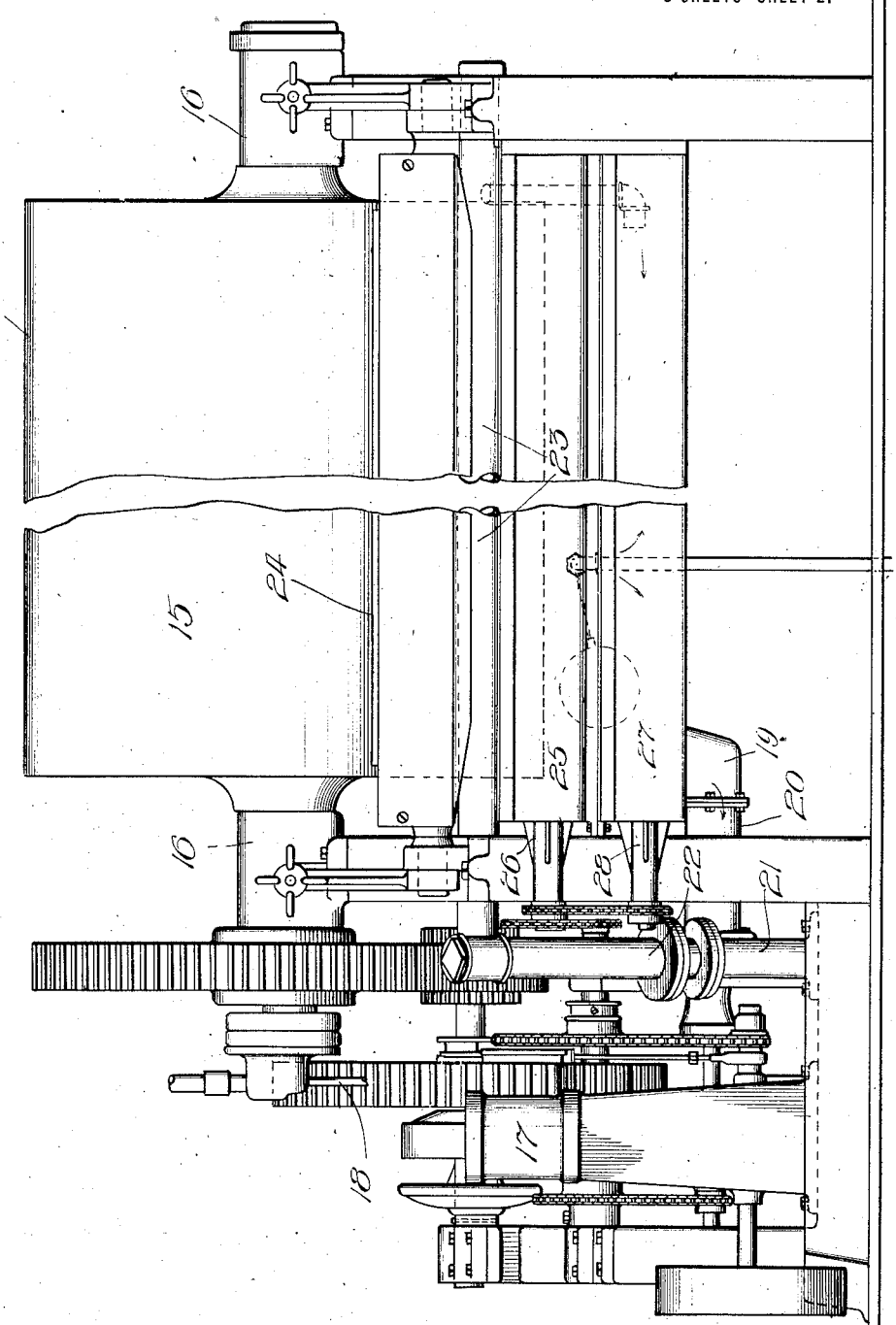
Witness:
Harry S. Gaither
Inventor:
Norman P. Collis
by
Attys

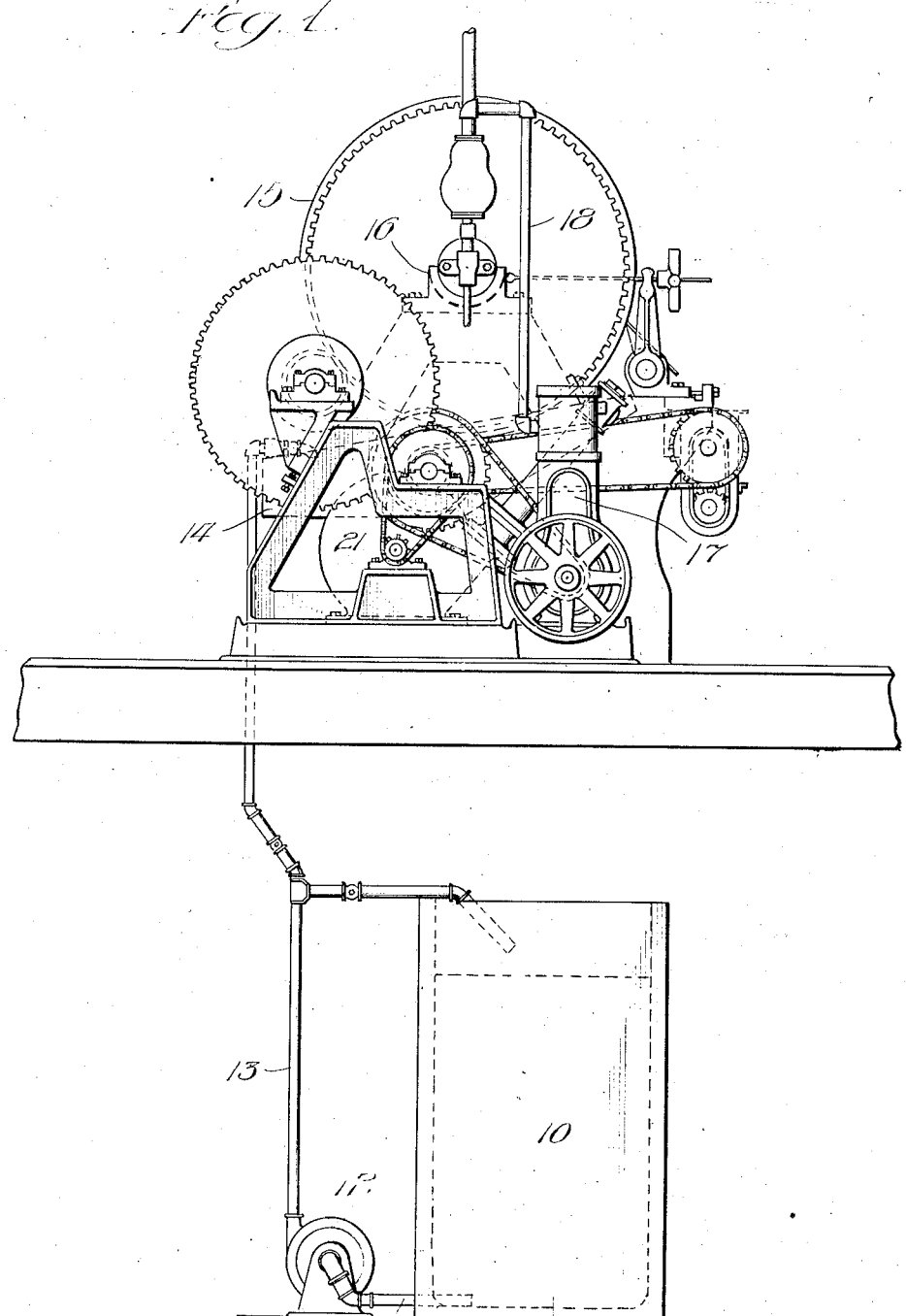

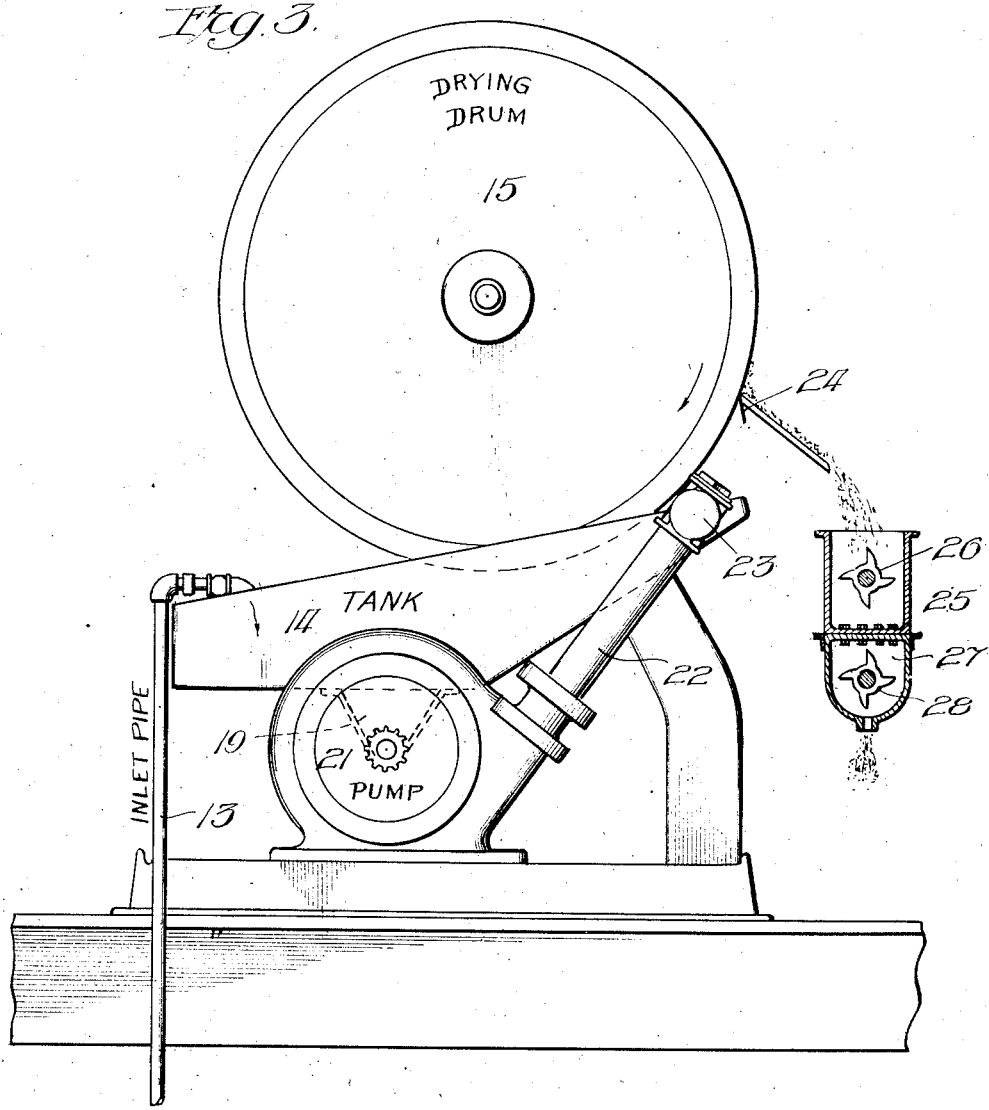

UNITED STATES PATENT OFFICE.

NORMAN P. COLLIS, OF ST. PAUL, MINNESOTA, ASSIGNOR TO COLLIS PRODUCTS COMPANY, OF CLINTON, IOWA, A CORPORATION OF WEST VIRGINIA.

METHOD OF DRYING BUTTERMILK.

1,356,340.  Specification of Letters Patent.  Patented Oct. 19, 1920.

Original application filed December 13, 1915, Serial No. 66,592. Divided and this application filed October 3, 1919. Serial No. 328,317.

*To all whom it may concern:*

Be it known that I, NORMAN P. COLLIS, a citizen of the United States, residing at St. Paul, in the county of Ramsey and State of Minnesota, have invented certain new and useful Improvements in Methods of Drying Buttermilk, of which the following is a specification, the same being a division of United States application Serial No. 66,592, filed December 13, 1915.

This invention pertains to a method or process of drying buttermilk for the purpose primarily of securing therefrom a pulverized or flaky product containing therein the food values of the buttermilk and adapted for use as one of the ingredients in a poultry or similar ration, or for use in the preparation of food products intended for human consumption.

The term "buttermilk," as used in the present specification, is intended to define the creamery by-product from which the butter fat has been mainly removed, and which consists of a soluble whey and an insoluble curd. The principal peculiarity of such buttermilk, in so far as it applies to the process of the present invention, resides in the fact that, as compared with fresh milk, it has undergone a chemical change with an attendant physical change, so that the buttermilk no longer constitutes a homogeneous soluble substance like sweet milk, but, on the contrary, constitutes a mass in which the insoluble curds are held in complete or partial suspension in the liquid whey.

If this mass be permitted to stand for any appreciable length of time, the curd particles will separate from the whey and precipitate themselves at the bottom of the mass; and the whey will partially clarify to the form of a thin liquid, so that in order to conserve the food values which are present both in the curd and in the whey, it is necessary to bring the mass to the drying point in a thoroughly agitated condition— that is, to a condition in which the curds will be finely divided and distributed evenly throughout the liquid whey in order that both may be simultaneously and evenly subjected to the drying process.

The process of the present invention is thus designed to act uniformly upon a mixture of two ingredients possessing diverse physical properties, without thereby destroying or impairing the food values contained in each, and to transform these food values in equally dry or pulverized condition in which they may be stored or preserved indefinitely for use either in pulverized form or in association with liquid food ingredients, as occasion may require.

The product of the present invention is peculiarly adapted for use as an ingredient in a poultry ration in combination with grains, grits, and other ingredients, and is also of peculiar value in the making of bread for human use in which it supplies certain desirable nutritive elements, and also tends to improve the physical properties of the bread.

The present buttermilk product contains all of the nutritive or food values of skim milk with an additional butter fat and lactic acid. When added to the sponge it accelerates the function of yeast and assists in the fermentation, by softening the gluten and giving the yeast greater activity. This increases the expansion and shortens the time of fermentation, or gives a greater amount of fermentation during the same time. Lactic acid is also a preventive for "rope," a bread disease most prevalent during the warmer months, or where low grade wheat flour or cereal flours are used.

The process of the present invention consists in the several steps hereinafter described and claimed.

In the drawings:

Figure 1 is an end elevation of a machine or apparatus to carry out the process of the present invention;

Fig. 2 is a side elevation of the same; and

Fig. 3 is a diagrammatic view concerning the principal portions of the apparatus involved in the process of the present invention.

The process consists essentially in subjecting the buttermilk containing the liquid whey and insoluble curd to an initial and continuous agitation up to the point where it is delivered in the form of a fine film or spray to the heated surface of a revolving drum upon which it is deposited and dried during the revolution of the drum and from which it is scraped and afterward deposited in a trough or the like for finely pulverizing and drying preparatory to packing and storing.

The machine adapted to perform this process comprises a buttermilk storage tank 10 which is preferably located in the basement of the establishment, which tank, has, leading therefrom, a pipe 11 connecting with a pump 12 which, in turn, discharges the buttermilk in agitated or finely divided condition through a pipe 13 which leads up to the first floor of the establishment, and discharges the buttermilk into a tank 14, which latter underlies a heating drum 15 suitably journaled in bearings 16 and adapted to be heated by the admission of exhaust steam from an engine 17, the exhaust steam being carried through an exhaust pipe 18 and discharged into the end of the drum through one of the bearings.

The buttermilk discharged from the tank 14 is exhausted therefrom through a sub tank 19, from which leads a pipe 20 communicating with a pump 21 driven by suitable sprocket chain connections with the engine 17, which pump again thoroughly agitates the buttermilk and discharges it in a frothy or foamy and finely divided condition through a pipe 22 which, in turn, communicates with a sprayer pipe 23 located in close parallel relation to the surface of the heating drum. This pipe is slotted or perforated on the side adjacent to the drum for the purpose of discharging a thin sheet or film of the finely divided and agitated buttermilk onto the heated surface of the drum which is constantly rotating in a clockwise direction and at a slow speed, so that the film of buttermilk deposited on the surface of the drum will be quite thoroughly dried during a little less than one revolution, at which point it is scraped from the surface of the drum by the action of a knife or scraper 24 and deposited in a trough 25, through which it is fed, and at the same time dried and broken up by the action of a revolving beater 26 being ultimately discharged into a second underlying trough 27 provided with a similar beater 28. If the discharge from the second tank into the buttermilk product is in a pratically dry or pulverized condition, it may be stored indefinitely and used as required.

The drawings disclose a complete self-contained apparatus for performing the process of the present invention, suitable gearing and connections being provided for operating the pumps, drum and meters from a single source of power, but obviously these details may be changed or modified as occasion may require.

It is important in practising the process of the present invention that the agitation of the mass be sufficiently violent to thoroughly break up the curds into a finely divided condition, so that they will be held in complete suspension up to and at the time of deposition on the heated surface of the drum, so that the heat may act equally upon the soluble and insoluble constituents up to the point of removal from the drum by the action of the scraper.

In certain previous processes adapted for the drying of fresh milk or like completely soluble liquid materials, a heating drum has been employed, but in a case of this kind no agitation is required, since the material treated was in a naturally liquefied soluble homogeneous condition. Such processes, however, are not adapted for the treatment of buttermilk containing soluble and insoluble food values, both of which must be conserved in the completed product.

I claim:

1. The herein described method of desiccating buttermilk of that nature which consists in a liquefied whey containing insoluble curd particles in suspension, which process consists in subjecting a body of the buttermilk to thoroughly agitation to prevent precipitation of the curd within the whey and to maintain the insoluble curd particles in finely divided condition and in suspension in the whey, then spraying the liquid resultant while in the thoroughly mixed condition secured by agitation, upon the heated surface of a heating medium to effect evaporation of the moisture and the deposit of both soluble and insoluble food values and then removing the mass from the heating medium, substantially as described.

2. The herein described method of desiccating buttermilk of that nature which consists in a liquefied whey containing insoluble curd particles in suspension, which process consists in subjecting a body of the buttermilk to thorough agitation to prevent precipitation of the curd within the whey and to maintain the insoluble curd particles in finely divided condition and in suspension in the whey, then spraying the liquid resultant while in the thoroughly mixed condition secured by agitation, upon the heated surface of a heating medium to effect evaporation of the moisture and the deposit of both soluble and insoluble food values and then removing the mass from the heating medium, and then mechanically moving the mass through air to effect a complete drying and disintegration of the resultant, substantially as described.

NORMAN P. COLLIS.